(12) United States Patent
Hochi

(10) Patent No.: US 7,703,489 B2
(45) Date of Patent: Apr. 27, 2010

(54) RUBBER COMPOSITION FOR BASE TREAD AND PNEUMATIC TIRE

(75) Inventor: Kazuo Hochi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 844 days.

(21) Appl. No.: 11/019,310

(22) Filed: Dec. 23, 2004

(65) Prior Publication Data

US 2005/0182177 A1 Aug. 18, 2005

(30) Foreign Application Priority Data

Feb. 17, 2004 (JP) ............................. 2004-039835

(51) Int. Cl.
*B60C 1/00* (2006.01)
*C08K 3/04* (2006.01)
*C08K 3/34* (2006.01)

(52) U.S. Cl. .................. 152/209.1; 152/905; 524/444; 524/445; 524/449; 524/495; 524/496; 524/526

(58) Field of Classification Search ................ 524/445, 524/447, 495, 496, 444, 449, 526
See application file for complete search history.

(56) References Cited

U.S. PATENT DOCUMENTS

| | | | | |
|---|---|---|---|---|
| 3,878,147 A | * | 4/1975 | Craven | 523/150 |
| 4,433,094 A | * | 2/1984 | Ogawa et al. | 524/496 |
| 5,871,846 A | * | 2/1999 | Freeman et al. | 428/405 |
| 6,013,699 A | * | 1/2000 | Freeman et al. | 523/212 |
| 2004/0261926 A1 | * | 12/2004 | Ozel et al. | 152/209.5 |

FOREIGN PATENT DOCUMENTS

| | | | |
|---|---|---|---|
| EP | 1 195 402 A1 | * | 4/2002 |
| EP | 1 500 678 A1 | | 1/2005 |
| JP | 200-016028 | * | 1/2000 |
| JP | 2000-016028 | * | 1/2000 |
| JP | 2000-16028 A | | 1/2000 |
| JP | 2002-88208 A | | 3/2002 |
| JP | 2003-12866 A | | 1/2003 |
| JP | 2004-27003 A | | 1/2004 |
| WO | WO 03/087214 | * | 10/2003 |

* cited by examiner

*Primary Examiner*—Vickey Nerangis
(74) *Attorney, Agent, or Firm*—Birch, Stewart, Kolasch & Birch, LLP

(57) ABSTRACT

The present invention provides a rubber composition for a base tread, which improves balance in low heat generating properties and steering stability, and a pneumatic tire using the same. Specifically, the present invention provides a rubber composition for a base tread of a tire comprising 5 to 120 parts by weight of a laminated natural mineral having aspect ratio of 3 to 30 and average particle size of 2 to 30 μm, based on 100 parts by weight of a diene rubber component, and a pneumatic tire having a base tread comprising the rubber composition.

8 Claims, No Drawings

RUBBER COMPOSITION FOR BASE TREAD AND PNEUMATIC TIRE

BACKGROUND OF THE INVENTION

The present invention relates to a rubber composition for a base tread and a pneumatic tire using the same, particularly a rubber composition for a base tread, which has excellent fuel efficiency and steering stability, and a pneumatic tire using the same.

In recent years, demands regarding fuel efficiency are severe and low heat generation is desired in tread rubber, which occupies a high proportion of a tire. Therefore, the method of preparing a tread having a two layer structure of cap/base and using rubber having low heat generating properties for the base tread is common.

In order to reduce heat generation of the base tread, either the amount of carbon black is reduced or carbon black having large particle size is used. Also, the method of achieving both low heat generating properties and reinforcing properties by using silica and carbon black together is suggested (for example, see JP-A-2003-12866). However, in these methods, the hardness of the rubber decreases, thereby lowering the stiffness of the tire tread, and as a result, there is the problem that steering stability decreases.

Also, the method of improving air permeability resistance by compounding a laminated natural mineral in the inner liner rubber is known (for example, see JP-A-2002-88208). However, it is not described whether low heat generating properties and steering stability can sufficiently be obtained by compounding a laminated natural mineral in the base tread rubber.

SUMMARY OF THE INVENTION

The present invention aims to provide a rubber composition for a base tread, which improves balance in low heat generating properties and steering stability, and a pneumatic tire using the same.

The present invention relates to a rubber composition for a base tread of a tire comprising 5 to 120 parts by weight of a laminated natural mineral having aspect ratio of 3 to 30 and average particle size of 2 to 30 μm, based on 100 parts by weight of a diene rubber component.

The rubber composition preferably further comprises carbon black; the ratio of the weight of the carbon black to the weight of the laminate natural mineral being 1/8 to 8/1.

The present invention also relates to a pneumatic tire having a base tread comprising the rubber composition; the volume ratio of said base tread being 10 to 40% of the whole tread.

DETAILED DESCRIPTION

The rubber composition for a base tread of the present invention comprises a diene rubber component and a laminated natural mineral.

Examples of the diene rubber component are natural rubber (NR), isoprene synthetic rubber (IR), butadiene rubber (BR), styrene-butadiene rubber (SBR), acrylonitrile-butadiene rubber (NBR), chloroprene rubber (CR), butyl rubber (IIR) and styrene-isoprene-butadiene copolymer rubber (SIBR). These diene rubbers can be used alone or two or more kinds can be used together. Of these from the viewpoint of low heat generating properties, NR and/or IR is preferably used.

The total content of NR and/or IR in the rubber component is preferably at least 30% by weight. When the content is less than 30% by weight, a great deal of heat tends to be generated.

As the laminated natural mineral, micas such as kaolinite, sericite, phlogopite and muscovite are preferable and of these, from the viewpoint of balance in hardness and low heat generating properties obtained by adding to the rubber composition, sericite is more preferable.

The aspect ratio (ratio of maximum diameter to thickness) of the laminated natural mineral is at least 3, preferably at least 5, more preferably at least 10. When the aspect ratio of the laminated natural mineral is less than 3, sufficient rubber hardness cannot be obtained. Also, the aspect ratio of the laminated natural mineral is at most 30, preferably at most 20. When the aspect ratio is larger than 30, dispersability of the laminated natural mineral in the rubber decreases and strength at break decreases. The aspect ratio is found by measuring the major axis and the minor axis of 50 random particles of the laminated natural mineral observed by an electron microscope and calculating a/b from the average major axis a and average minor axis b.

The average particle size of the laminated natural mineral is at least 2 μm, preferably at least 5 μm, more preferably at least 10 μm. When the average particle size is less than 2 μm, costs for pulverization are high and sufficient rubber hardness cannot be obtained. Also, the average particle size of the laminated natural mineral is at most 30 μm, preferably at most 20 μm. When the average particle size is more than 30 μm, the laminated natural mineral becomes a site for destruction and bending fatigue resistance decreases. The average particle size refers to the average value of the major axis of the laminated natural mineral.

The content of the laminated natural mineral is at least 5 parts by weight, preferably at least 10 parts by weight, particularly preferably at least 15 parts by weight, based on 100 parts by weight of the diene rubber component. When the content is less than 5 parts by weight, the effects of adding the laminated natural mineral cannot sufficiently be obtained. Also, the content of the laminated natural mineral is at most 120 parts by weight, preferably at most 80 parts by weight, particularly preferably at most 60 parts by weight. When the content is more than 120 parts by weight, dispersing the laminated natural mineral in the rubber tends to become difficult and heat tends to be generated.

The rubber composition for a base tread of the present invention can further contain carbon black.

The carbon black preferably has nitrogen-adsorbing specific surface area ($N_2SA$) of at least 30 $m^2/g$, preferably at least 70 $m^2/g$. When $N_2SA$ is less than 30 $m^2/g$, reinforcing properties tend to be insufficient. Also, $N_2SA$ of the carbon black is at most 250 $m^2/g$, preferably at most 150 $m^2/g$. When $N_2SA$ of the carbon black is more than 250 $m^2/g$, heat generating properties tend to become high.

The content of carbon black is at least 10 parts by weight, preferably at least 20 parts by weight, based on 100 parts by weight of the diene rubber component. When the content of carbon black is less than 10 parts by weight, reinforcing properties tend to be insufficient. Also, the content of carbon black is at most 60 parts by weight, preferably at most 50 parts by weight. When the content is more than 60 parts by weight, a great deal of heat tends to be generated.

The ratio of the weight of carbon black to the weight of the laminated natural mineral is preferably 1/8 to 8/1.

Besides the diene rubber component, the laminated natural mineral and carbon black, the rubber composition for a base tread of the present invention can contain additives such as silica, silane coupling agents and sulfur that are usually used when preparing rubber compositions for tire treads, when necessary, within the range of the usually used amount.

As the process for preparing the rubber composition of the present invention, known methods can be used and for example, each of the components are preferably kneaded using a rubber kneading machine such as an open roll or a banbury mixer.

The pneumatic tire of the present invention has a tread having a multi-layer structure and is prepared using the rubber composition of the present invention for the base tread. Also, the tread of the pneumatic tire can have a two-layer structure comprising a cap tread and a base tread.

In the case that the tread has a two-layer structure, tan δ at 50° C. of the rubber composition for the base tread is preferably smaller than tan δ at 50° C. of the rubber composition for the cap tread.

The volume ratio of the base tread obtained using the rubber composition for the present invention is preferably at least 10%, more preferably at least 20%, of the whole tread. When the volume ratio is less than 10%, the effects of suppressing heat generation and reducing rolling resistance tend to be insufficient. Also, the volume ratio is preferably at most 40%. When the volume ratio is more than 40%, the base tread may be exposed form the surface of the tire when the tire is worn out. In the case that the tread has a two-layer structure comprising a base tread and a cap tread or a multi-layer structure of at least three layers, the volume ratio of the base tread is preferably 10 to 40% of the whole tread.

A tread having a multi-layer structure can be prepared by the method of laminating sheets prepared from the rubber composition into a specific shape or by the method of charging the rubber composition in two or more extruders and forming two or more layers at the outlet of the extruder head.

Hereinafter, the present invention is explained in detail based on Examples, but the present invention is not limited thereto.

EXAMPLES 1 AND 2 AND COMPARATIVE EXAMPLES 1 TO 4

The chemicals used in Examples and Comparative Examples are shown below.

NR: RSS#3

BR: Nipol BR1220 available from Zeon Corporation

Carbon black (HAF): Seast NH-grade ($N_2SA$: 74 $m^2$/g) available from Tokai Carbon Co., Ltd.

Sericite: KM-8 (aspect ratio: 15, average particle size: 17 μm) available from Nippon Forum Co., Ltd.

Aromatic oil: Diana Process AH-24 available from Idemitsu Kosan Co., Ltd.

Zinc oxide: Zinc oxide available from Mitsui Mining and Smelting Co., Ltd.

Stearic acid: Tsubaki available from NOF Corporation

Antioxidant: Antigen 6C (N-(1,3-dimethylbutyl)-N'-phenyl-p-phenylenediamine) available from Sumitomo Chemical Co., Ltd.

Wax: SUN NOC N available from Ohuchi Shinko Kagaku Kogyo Co., Ltd.

Sulfur: Powdery sulfur available from Karuizawa Seirensho K. K.

Vulcanization accelerator: Nocceler CZ (N-cyclohexyl-2-benzothiazylsulfenamide (CBS)) available from Ohuchi Shinko Kagaku Kogyo Co. Ltd.

According to the composition shown in Table 1, NR, BR, carbon black, sericite, aromatic oil, zinc oxide, stearic acid, antioxidant and wax were kneaded using a banbury mixer for 3 minutes at 140° C. Powdery sulfur as the vulcanizing agent and a vulcanization accelerator were kneaded with the obtained rubber compound using a roll for 4 minutes at 80° C. to obtain a rubber composition for a base tread.

An unvulcanized tire was prepared using the obtained rubber composition for the base tread and a test tire (size: 195/65R15) was prepared by vulcanizing the unvulcanized tire. The volume ratio of the base tread to the tire tread was adjusted to 30%.

The obtained test tire was used for each test.

The tests used in Examples and Comparative Examples are shown below.

(Rolling Resistance)

The rolling resistance of the test tire when run under conditions of rim of 15×6 JJ, inner pressure of 230 kPa, load of 3.43 kN and speed of 80 km/h was measured using a rolling resistance testing machine. The rolling resistance value of Comparative Example 1 was represented as 100 and the rolling resistance of each tire was represented as an index based thereon. The larger the index is the smaller the rolling resistance, thus being favorable.

(Steering Stability)

The test tire was mounted as the front wheels of a vehicle (Japanese FF 2000 cc) and actually driven on a test course. The steering stability was evaluated by sensory evaluation by the driver. Evaluation was conducted on a scale of 10, relative to Comparative Example 1, which was evaluated as 6. The larger the value is the better the steering stability.

The evaluation results of the tests are shown in Table 1.

TABLE 1

|  | Ex. | | Com. Ex. | | | |
| --- | --- | --- | --- | --- | --- | --- |
|  | 1 | 2 | 1 | 2 | 3 | 4 |
| Composition (parts by weight) | | | | | | |
| NR | 60 | 60 | 60 | 60 | 60 | 60 |
| BR | 40 | 40 | 40 | 40 | 40 | 40 |
| Carbon black | 28 | 25 | 35 | 34 | 5 | 28 |
| Sericite | 15 | 25 | — | 3 | 130 | — |
| Aromatic oil | 5 | 5 | 5 | 5 | 5 | 5 |
| Zinc oxide | 3 | 3 | 3 | 3 | 3 | 3 |
| Stearic acid | 2 | 2 | 2 | 2 | 2 | 2 |
| Antioxidant | 2 | 2 | 2 | 2 | 2 | 2 |
| Wax | 2 | 2 | 2 | 2 | 2 | 2 |
| Sulfur | 2 | 2 | 2 | 2 | 2 | 2 |
| Vulcanization accelerator | 1.3 | 1.3 | 1.3 | 1.3 | 1.3 | 1.3 |
| Evaluation results | | | | | | |
| Rolling resistance | 101 | 100 | 100 | 100 | 93 | 102 |
| Steering stability | 6 | 6.5 | 6 | 6 | 7 | 5.5 |

According to the present invention, by compounding a specific amount of a specific kind of laminated natural mineral in the rubber composition for a base tread, heat generation can be lowered while maintaining the hardness and stiffness of rubber. Consequently, by using the rubber composition for a base tread, a tire having excellent steering stability while maintaining low heat generating properties can be obtained.

What is claimed is:

1. A pneumatic tire having a base tread comprising a rubber composition for a base tread of a tire;
   wherein the volume ratio of said base tread is 10 to 40% of the whole tread, and
   wherein said rubber composition for a base tread of a tire comprises 15 to 120 parts by weight of sericite having an aspect ratio of 3 to 30 and an average particle size of 2 to 30 µm,
   based on 100 parts by weight of a diene rubber component consisting of natural rubber and butadiene rubber.

2. The pneumatic tire of claim 1, wherein the rubber composition further comprises carbon black;
   the ratio of weight of said carbon black to the weight of said laminate natural mineral being 1/8 to 8/1.

3. The pneumatic tire of claim 1, wherein the rubber composition comprises 15 to 80 parts by weight of a laminated natural mineral sericite having an aspect ratio of 10 to 20 and an average particle size of 10 to 20 µm, based on 100 parts by weight of the diene rubber component.

4. The pneumatic tire of claim 2, wherein the rubber composition comprises 15 to 80 parts by weight of sericite having aspect ratio of 10 to 20 and an average particle size of 10 to 20 µm,
   based on 100 parts by weight of the diene rubber component.

5. The pneumatic tire of claim 3, wherein the content of natural rubber in the diene rubber component is at least 30% by weight.

6. The pneumatic tire of claim 4, wherein the content of natural rubber in the diene rubber component is at least 30% by weight.

7. The pneumatic tire of claim 1, wherein the sericite has an average particle size of 5 to 30 µm.

8. The pneumatic tire of claim 2, wherein the sericite has an average particle size of 5 to 30 µm.

* * * * *